(12) United States Patent
David et al.

(10) Patent No.: US 7,840,816 B2
(45) Date of Patent: Nov. 23, 2010

(54) IDENTIFYING MATERIAL STORED USING A SIGNATURE AS A RETRIEVAL INDEX

(75) Inventors: Morgan William Amos David, Farnham (GB); Jonathan James Stone, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 36 days.

(21) Appl. No.: 11/943,459

(22) Filed: Nov. 20, 2007

(65) Prior Publication Data

US 2008/0072335 A1    Mar. 20, 2008

Related U.S. Application Data

(60) Division of application No. 10/011,225, filed on Dec. 4, 2001, which is a continuation of application No. PCT/GB01/01492, filed on Mar. 30, 2001.

(30) Foreign Application Priority Data

Apr. 5, 2000   (GB) .................................. 0008437.6
Aug. 14, 2000  (GB) .................................. 0019985.1

(51) Int. Cl.
*H04L 9/32* (2006.01)
(52) U.S. Cl. ..................................................... 713/176
(58) Field of Classification Search ................... None
See application file for complete search history.

(56) References Cited

U.S. PATENT DOCUMENTS

| | | | |
|---|---|---|---|
| 5,721,788 A * | 2/1998 | Powell et al. ............... 382/100 |
| 5,805,699 A | 9/1998 | Akiyama et al. | |
| 6,101,602 A | 8/2000 | Fridrich | |
| 6,131,162 A | 10/2000 | Yoshiura et al. | |
| 6,310,956 B1 * | 10/2001 | Morito et al. ............... 380/201 |
| 6,398,245 B1 | 6/2002 | Gruse et al. | |

(Continued)

FOREIGN PATENT DOCUMENTS

EP        0 766 468        4/1997

(Continued)

OTHER PUBLICATIONS

SMPTE Journal, Proposed SMPTE Standard for Television—Unique Material Identifier (UMID), Mar. 2000, pp. 221-225.

(Continued)

*Primary Examiner*—Emmanuel L Moise
*Assistant Examiner*—Nadia Khoshnoodi
(74) *Attorney, Agent, or Firm*—Oblon, Spivak, McClelland, Maier & Neustadt, L.L.P.

(57) ABSTRACT

A method of identifying material which includes the step of inserting an identifying code into a signal as a watermark, and deriving a signature from the material. The code and signature are stored in a database. The watermarked signal may be distributed and/or transmitted through a network. The signal may be processed in the network. A monitor derives from the received signal, the signature and the code. The derived signature and the derived code are compared with the stored signature and code to check the provenance of the material. The watermark contains an authorization code allowing duplication of the material.

15 Claims, 5 Drawing Sheets

U.S. PATENT DOCUMENTS

| 7,159,116 B2 | 1/2007 | Moskowitz |
| 2002/0038296 A1* | 3/2002 | Margolus et al. ............... 707/1 |

FOREIGN PATENT DOCUMENTS

| EP | 0 862 318 | 9/1998 |
| EP | 0 898 396 | 2/1999 |
| EP | 0 982 927 | 3/2000 |
| EP | 1 001 601 | 5/2000 |
| JP | 11-066009 | 3/1999 |
| JP | 11-327438 | 11/1999 |
| JP | 11-0327438 | 11/1999 |
| JP | 11-338876 | 12/1999 |
| JP | 11-339373 | 12/1999 |
| WO | WO 00/56059 | 9/2000 |

OTHER PUBLICATIONS

K. Tanaka et al., "Embedding Secret Information Into a Dithered Multi-Level Image" . IEEE Military Communications Conference pp. 216-220, 1990.

Dittman J. et al. "Content-Based Digital Signature for Motion Pictures Authenticataion and Content-Fragile Watermarking" Proceedings of Th Einternational Conference on Multimedia Computing and Systems, Los Alamitos, CA, US, vol. 2, Jun. 1999, pp. 209-213, XPOOO939251.

Japanese Office Action dated Jul. 6, 2010 (with English translation) (6 pgs.).

SMPTE Standard 330M-2000, "For Television- Unique Material Identifier (UMID)", (Jan. 2000), pp. 1-10.

* cited by examiner

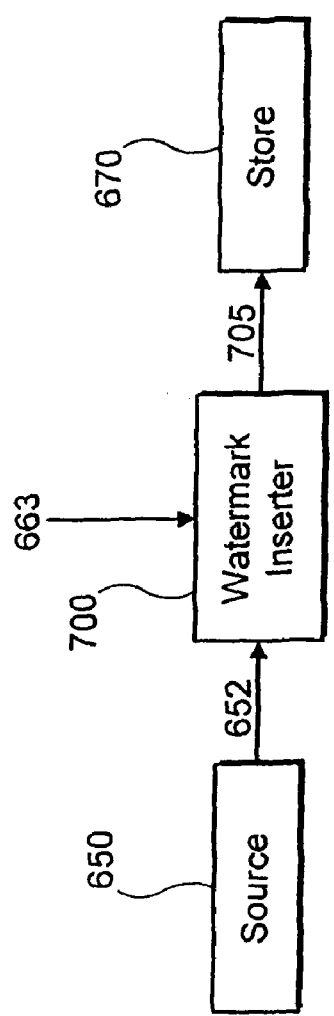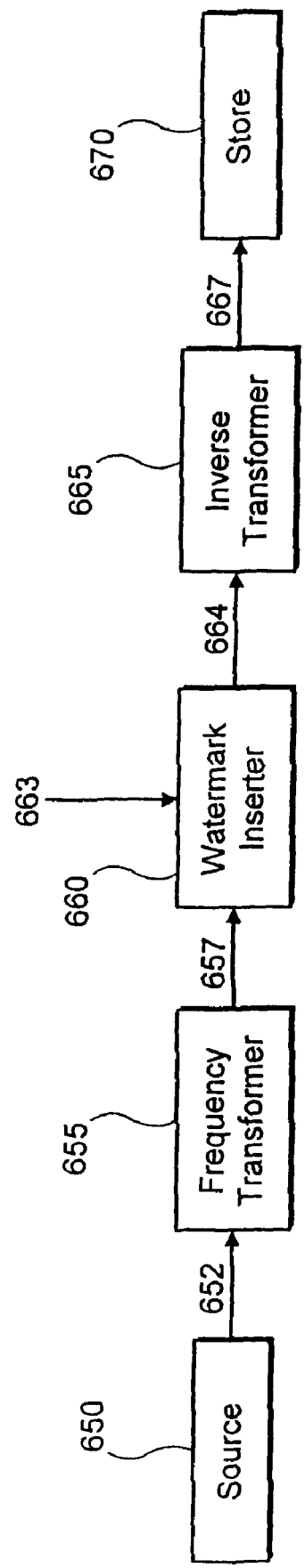

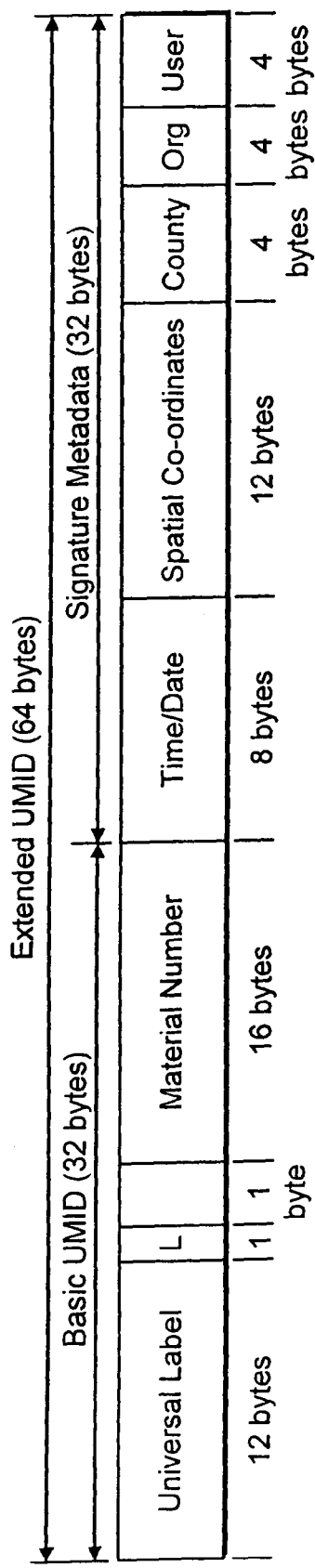
FIG. 6  Basic and Extended UMID Structures
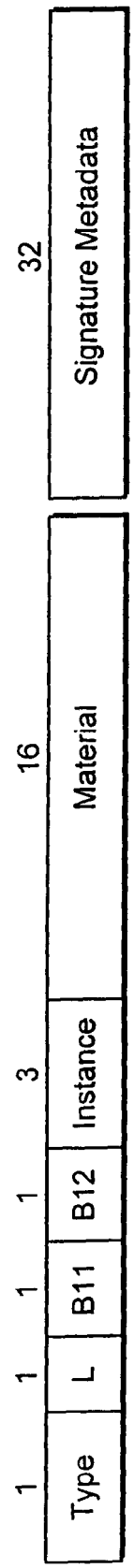
FIG. 7

IDENTIFYING MATERIAL STORED USING A SIGNATURE AS A RETRIEVAL INDEX

CROSS-REFERENCE TO RELATED APPLICATIONS

This application is related to and claims priority under 35 U.S.C. §121 to U.S. Ser. No. 10/011,225 which is a continuation of PCT/GB06/01492.

The present invention relates to identifying material. The invention also relates to a method of, and apparatus for, identifying such material. Thus material is represented by an information signal, which preferably is a digital signal.

The material may be one or more of video material, audio material and data material. Reference will be made in the following to video material for convenience. However the invention is not limited to video material. It may be applied to audio material. It may be applied to data material other than audio and video.

It is known to identify video material by applying a "watermark" to the video signal. A watermark is a coded signal, which is combined with the video signal. A watermark may be combined in such away that the coded signal is invisible or substantially invisible in the displayed image. The coded signal is detectable in the video signal: it is used for detecting infringement of copyright for example. However, watermarks may be damaged or removed deliberately or inadvertently by further processing of the material e.g. by editing or applying special effects.

According to the present invention there is provided a method of identifying material comprising the steps of inserting an identifying code into the material as a watermark, and deriving from the material a signature.

It will be appreciated that the step of deriving the signature may precede or succeed the step of inserting the watermark.

In preferred examples of the invention, a signature is data characteristic of the material or data derived from data characteristic of the material. It is derived from the material. For example a signature may be the locations of the maximum and minimum values of a signal. For example it may be the coordinates of the brightest and least bright pixels in each frame of a video sequence. A signature may be a histogram of measurable components of the material. For example it may be a histogram of chrominance values of a video sequence. The signature depends on the material. It does not require data to be added to the material; it is derived from the material.

According to another aspect of the invention, there is provided apparatus comprising a code generator for generating an identifying code, a watermark generator for generating from the code a watermark and for combining the watermark with material, and a signature generator for deriving a signature from the material.

Watermarks can be vulnerable to damage and/or removal from video material. Thus if a watermark is damaged or removed it may be difficult or impossible to prove the provenance of the material. The characteristics of the material which produce the signature may also be damaged or removed but not by the same processes which remove or damage watermarks. By deriving a signature which is characteristic of the material, and having a watermark, two independent means of proving provenance are provided. Thus if one is damaged or removed then the other is likely to be available to prove provenance.

By providing the code in the watermark in the material, the material retains its identification throughout the production and distribution chain following the provision of the code. This also avoids the necessity of a separate channel such as a separate tape track for the identifying code. That makes easier subsequent material processing with retention of the identifying code in association with the material.

In a preferred method, the code identifies the material instead of or in addition to identifying ownership.

The code is preferably used to bind the material to metadata which is associated with the material.

Most preferably, the signature and the identifying code are stored in a database. Material is monitored to determine whether it includes a watermark. The monitored material is processed to derive the signature from it. The watermark if present and the derived signature are compared with those in the database to determine the provenance of the material.

In one embodiment of the invention, material is recorded on an example of a recording medium and the identifying code is a code identifying the example of the recording medium. The identifying code may be, for example, a serial number. The identifying code may be used to refer to a UMID, a unique material identifier.

In another embodiment, the code is a UMID.

A UMID and a code which identifies an example of the recording medium are short compared to conventional watermark codes and thus more able to survive processing of the material and more difficult to remove.

In an embodiment in which the code is a UMID, the instance number of the UMID is used to provide in a plurality of copies of a piece of material respective UMIDs and thus watermarks which are unique to individual users or groups of users.

For a better understanding of the present invention, reference will now be made by way of example to the accompanying drawings in which:

FIGS. 2 and 3 are schematic block diagrams of watermarking systems;

FIGS. 6 and 7 show data structures of material identifiers; and

The following description illustrates the invention by way of reference to video material. However, the invention is not limited to video material.

OVERVIEW

Figure 1:
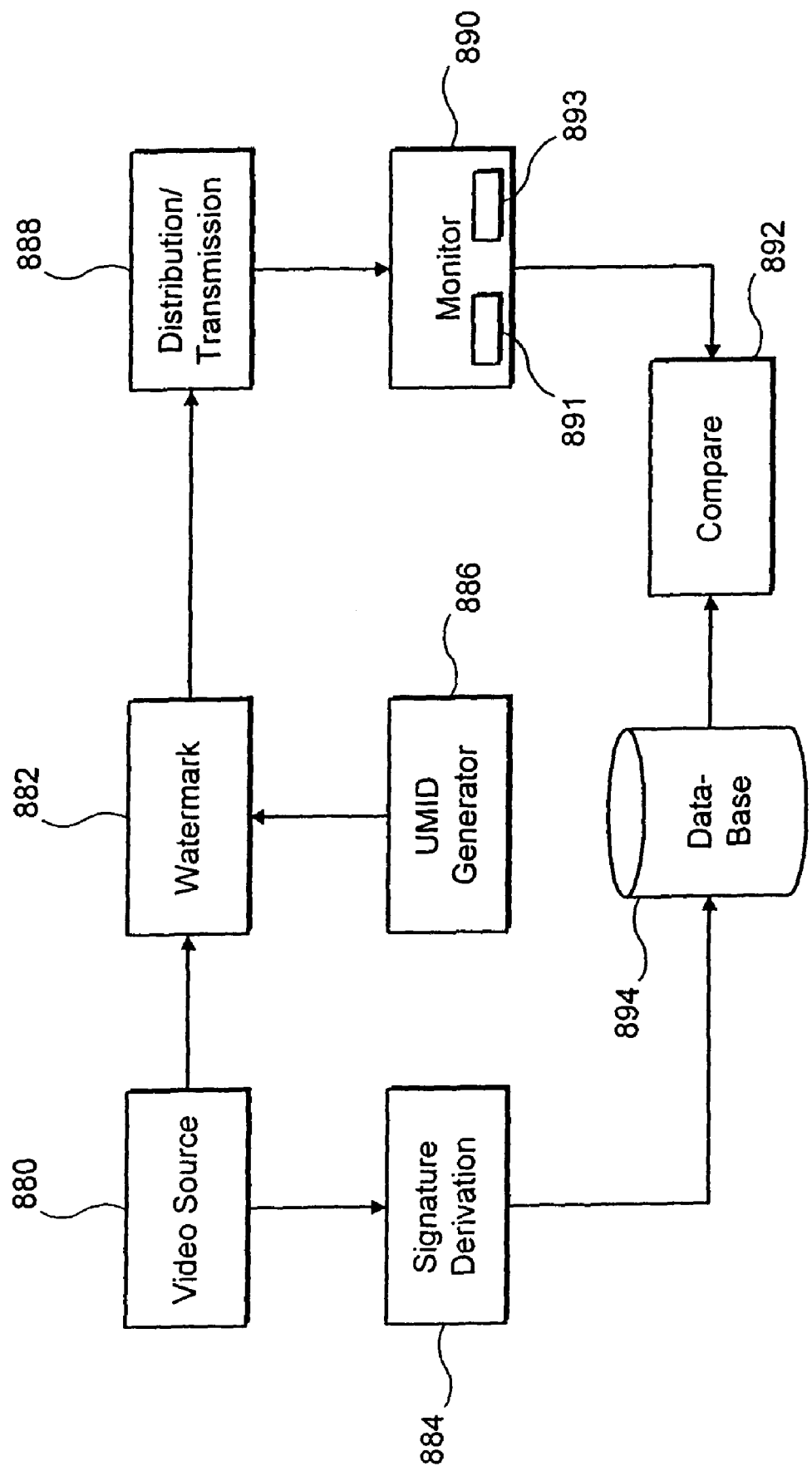
FIG. 1 is a schematic block diagram of a system in accordance with the invention.

Referring to FIG. 1, a video source 880 produces video material. The source may be a camera, a Video Tape Recorder, a video server, or any other suitable source. A watermark is inserted into, or applied to, the video material by a watermark generator 882. Watermarking is discussed in the section Watermarking below. In a preferred embodiment of the invention, the watermark is generated from a UMID. The UMID is generated by a UMID generator 886. UMIDs are discussed in the section UMIDs below. Thus in the preferred embodiment, the watermark based on UMIDs identifies the material and may also identify the owner of the material. UMIDs can identify material to the accuracy of one frame. Thus in a preferred embodiment a watermark is in every frame uniquely identifying each frame. In another preferred embodiment, the instance number fields of the UMIDs are used as "fingerprints" to distinguish different authorised users of the material.

The video material from the source 880 is also provided to a signature generator 884 which derives a signature from the material. Signatures are discussed in the section Signatures below.

A data base processor 894 is provided. It is linked to the UMID generator 886 and to the signature generator 884 via suitable communication links, which may be cables, RF links, or computer network links for example. The database 894 stores the UMIDs and the signatures produced by the generators 884 and 886. It associates the signatures derived from the video material with the UMIDs applied to the same material.

The watermarked material is distributed and or transmitted to users via a distribution/transmission network 888. The network 888 is monitored by a monitoring station 890 to detect signatures and watermarks in video material. For example the material may be broadcast. The station 890 may comprise a receiver and a video recorder for recording the received video. The station has a signature generator 891 exactly identical to the generator 884. It also has a watermark detector 893. The received video is processed in the station to derive signatures from the material using exactly the same process as in generator 884. The received video is also processed to derive therefrom any watermarks and to detect the UMIDs of the watermarks.

Signatures and UMIDs thus derived from the received material are compared 892 with signatures and UMIDs in the database 894. Thus distributed material can be checked and for example misuse detected. Alternatively, or additionally, the UMIDs allow royalty collection for example because they uniquely identify the material.

Providing both a signature and a watermark is advantageous because watermarks might be removed or at least damaged in the distribution network especially if the material is processed by editing or by the application of special effects. Also, there is the possibility that attempts are made to deliberately remove watermarks. Likewise video material may be altered by such processing reducing the chance of deriving matching signatures from original and processed material. By providing both, one is more likely to be available to check the provenance of the material.

The database 894 may contain metadata relating to the material and linked to the material by the UMIDs. Examples of Metadata which may be contained in the database 894 are described in the section Metadata below.

Watermarking—FIGS. 2 and 3

There is an ever increasing amount of information, and particularly video, being recorded, stored and distributed digitally. The ease with which this information may be duplicated is a concern, since any copyrights in the underlying works may potentially be easily infringed by unauthorised copying. Accordingly, copyright owners may be unwilling to make available and distribute their works without adequate protection against copying, or without being able to demonstrate that a particular example of work originates from them and may be an infringing unauthorised copy.

One possible technique which seeks to provide a solution to this problem is digital watermarking. Digital watermarking allows a code to be embedded in a digital work which contains information which may, for example, identify the owner, the distributor and/or an authorisation code. The digital watermark may be used in conjunction with other deterrents such as encryption.

The digital watermark, hereinafter referred to as the watermark, should be unique such that it, for example, unambiguously identifies the owner, the distributor and/or provides an authorisation code, a technique often referred to as a fingerprinting. Also, the watermark may itself be a digital work such as an image, audio or video. The watermark may also contain an indication of whether the work may be copied freely, not copied at all or copied a predetermined number of times.

Preferably, the watermark should be undetectable, unalterable and non-removable by unauthorised individuals. Also, the watermark should not adversely degrade the underlying work in a manner that is readily perceptible. However, the watermark should be readily discernible by authorised individuals such that the owner and/or distributor may be identified.

The watermark should be easily embedded into the underlying digital work. Preferably, the embedding technique should be such that that this can be easily performed during recording, thereby watermarking the work at source, and thus minimising the possibility of any non-watermarked works being available.

The watermark may be placed in, for example, a header or label of a digital work, or the watermark may be embedded within the data fields of the digital work itself. Preferably, the watermark is reproduced many times within a work and, more preferably, is present in every frame of the digital work. Alternatively, the watermark may be placed directly onto the media which carries the digital work.

The watermark may be robust such that it may not be removed or degraded by individuals seeking to make unauthorised copies. Unauthorised attempts to remove the robust watermark should result in severe degradation of the data, rendering the data useless. Situations where the data contains much redundant information, such as in video, may render the robust watermark susceptible to attack by, for example, frame dropping or the like. Hence, the robust watermark should preferably withstand such attacks and may, for example, change from frame to frame and may utilise any error correction/recovery techniques which are applied to data.

Alternatively, the watermark may be fragile such that it is damaged should an unauthorised copy be made.

However, the watermark should also preferably be reversible and removable by the owner, if required. Removal may be particularly useful during, for example, a post-production stage to reduce any cumulative effects of the watermark on the underlying work. Also, where information from different sources are edited together it may be desired that a different watermark is applied to the edited product.

End-user equipment may be configured to recognise the watermark such that it will not allow copying of protected works. Alternatively, the equipment may be configured such that it will operate only with works originating from a particular owner, distributed through a particular distributor or where the work contains a particular authorisation code.

The watermark may be extracted by comparing watermarked with non-watermarked data and its authenticity established.

Two techniques for embedding a watermark within the data fields of a digital work will now be described in more detail. The first is to embed the watermark in the spatial domain, the second is to embed the watermark in the frequency domain. Both of these embedding processes should be such that they do not result in a significant degradation of the data being watermarked.

Spatial Domain Watermarks

The process, in overview, involves altering predetermined data bits with the bits of a watermark to produce watermarked data. The existence of watermark may be determined by performing the reverse operation on the watermarked data.

One approach is to embed a watermark by substituting insignificant bits of pseudo-randomly selected data with bits representing the watermark. However, these watermarks are susceptible destruction by processing the least significant bits of the data. Another is to insert geometric patterns into the data which represent a watermark. However, these watermarks are susceptible destruction by geometric processing of the data. A further approach is to embed a watermark in a manner which resembles quantisation noise as described with reference to FIG. 2 below and more fully described in articles titled "Embedding Secret Information into a Dithered Multi-Level Image" by K Tanaka et al, IEEE Military Communications Conference pages 216-220, 1990 and "Video Steganography" by K Mitsui, IMA Intellectual Property Proceedings, volume 1, pages 187-296, 1994. However, these watermarks are susceptible to destruction by signal processing, particularly by requantisation of the data.

Referring now to FIG. 2, a source 650 produces a digital data signal 652, such as digital video. A watermark inserter 700 is coupled to the source 650 and receives the digital data signal 652. The watermark inserter 700 applies the watermark 663 by applying the watermark to the digital data signal 652 in a manner that resemble requantisation noise to produce watermarked data 705. A storage device 670 is coupled to the watermark inserter 700 and stores the watermarked data 705.

A yet further approach is to randomly select n pairs of image points $(a_i, b_i)$ and increase the brightness of $a_i$ by one while decreasing the brightness of $b_i$ by one. Assuming certain statistical properties of the image are satisfied, the sum of the differences of the n pairs of points will be 2n.

Alternatively, where the data signal comprises at least two components (for example [Y, UV] according to MPEG, PAL or NTC), the watermark may be embedded by assigning values to these components which, in combination, do not usually occur. Also, where a watermark is to be embedded in, for example, video data containing two image fields, a positive watermark may be placed into the first field and a negative watermark into the second field. When watermarked image fields are played there is a masking effect due to the interlacing of the fields and the visual perception of the watermark is significantly reduced.

Frequency Domain Watermarks

The process, in overview, involves obtaining a frequency spectral image of the data to which the watermark is to be applied. The watermark is embedded into predetermined components of the of the frequency spectral image. Thereafter, the watermarked frequency spectral image is subjected to an inverse transform to produce watermarked data. The watermark may be extracted by performing the reverse operation on the watermarked data.

One approach is to partition the data into blocks and compute the Discrete Cosine Transform (DCT) of each of these blocks. Thereafter, the predetermined frequency coefficients of the blocks may be adjusted. A pseudo random subset of blocks may be chosen and in each such block coefficients of predetermined subset of frequencies adjusted such that their relative values encode a data bit. The variance in the relative values and the selection of the predetermined subset of frequencies should be such that the watermark is not perceptible. However, this watermark may be sensitive to damage by noise or further processing.

Alternatively, the watermark may be encoded by adjusting every frequency coefficient by a smaller amount as described with reference to FIG. 3 below and more fully described in European Patent Application 0 766 468, NEC Corporation. This has the advantage of making the watermark less sensitive to damage, but increases overall noise levels.

Referring now to FIG. 3, a source 650 produces a digital data signal 652, such as digital video. A frequency transformer 655 is coupled to the source 650 and receives the digital data signal 652. The frequency transformer 655 transforms the digital data signal 652 into frequency spectral data 657 using, for example, Discrete Cosine Transforms or Fast Fourier Transform techniques. A watermark inserter 660 is couple to the frequency transformer and receives the frequency spectral data 657. The watermark inserter applies the watermark 663 by adjusting each coefficient of the frequency spectral data 657 to produce watermarked frequency spectral data 663. An inverse frequency transformer 665 is coupled to the watermark inserter 660 and receives the watermarked frequency spectral data 663. The inverse frequency transformer 665 converts the watermarked frequency spectral data 663 into watermarked data 667. A storage device 670 may be coupled to the inverse frequency transformer 665 for storing the watermarked data 667.

A further approach is to increase the changes to coefficients in particular frequencies by exploiting the existence of so-called masking phenomena in the human visual and auditory systems. Masking occurs when certain regions of data are occluded by perceptually more prominent regions elsewhere in the data. However, these regions need to be identified prior to inserting the watermark which increases the embedding complexity.

A yet further approach is to compress the digital data and embed the watermark into the x and y co-ordinates of motion vectors of the compressed data. This has the advantage of the watermark being embedded after compression and, hence, is more robust to processing.

Figure 4:
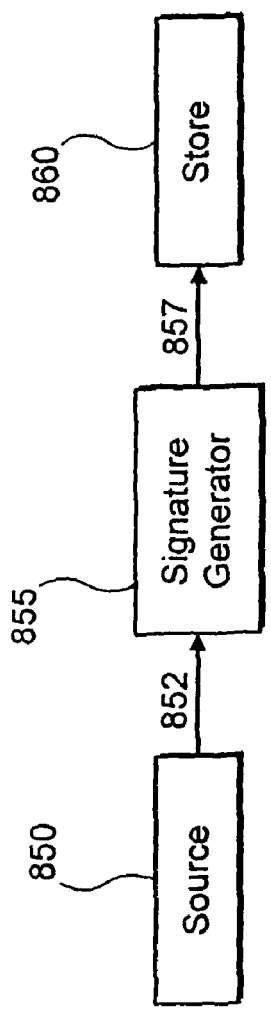
FIGS. 4 and 5 are schematic block diagrams of signature generation and detection systems.
Figure 5:
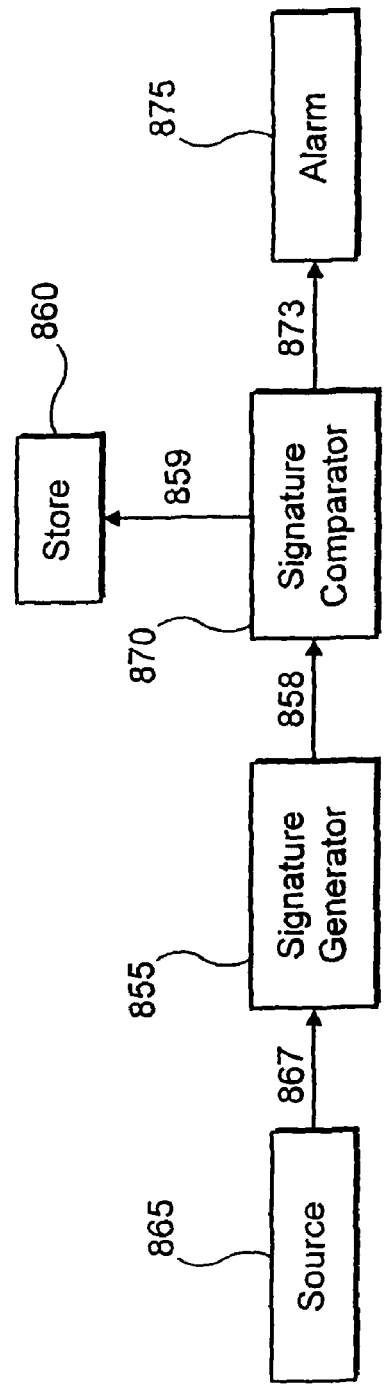

Signatures—FIGS. 4 and 5

There is an ever increasing amount of information, and particularly video, being recorded, stored and distributed digitally. The ease with which this information may be duplicated is a concern, since any copyrights in the underlying works may potentially be easily infringed by unauthorised copying. Accordingly, copyright owners may be unwilling to make available and distribute their works without adequate protection against copying, or without being able to demonstrate that a particular example of work originates from them and may be an infringing unauthorised copy.

One possible technique which seeks to provide a solution to this problem is the use of so-called digital signatures. A digital signature may be generated for any piece of digital information such as, for example, an image. The digital signature of a suspected infringing work may also be generated using the same technique. A correlation between the two signatures may suggest that the suspected work is a copy of the original work.

For digital works such as, for example, audio or video, a sequence of digital signatures may be generated from, for example, individual frames of data. A sequence of digital signatures of a suspected infringing work may also be generated using the same technique. A correlation between two successive sequences of signatures may suggest more conclusively that the suspected work is a copy of the original work.

The digital signature may be used in conjunction with other deterrents such as watermarking and encryption.

The digital signature, hereinafter referred to as the signature, should preferably be readily generated from the work. Preferably, the signature may be generated by applying an algorithm to the work.

Preferably, the algorithm generates a signature associated with empirical qualities of the work. Preferably, the algorithm should be robust such that there remains a close correlation between the signature generated from an original work and the signature generated from a copied work. Preferably, the algorithm should be robust to readily implemented processing techniques or to the introduction of noise.

The signature of original works may be generated and stored for future reference. Preferably, automated systems may be employed to monitor data streams which may contain suspected works. The automated system may generate signatures of suspected works, compare these to stored signatures of the original work and alert the owner of the original work should a correlation be found.

End-user equipment may be configured to recognise the signatures of original works such that it will not allow copying of those works. Alternatively, the equipment may be configured such that it will only play works which have a predetermined signature.

The process for generating a signature will now be described in more detail with reference to FIG. 4. A source 850 produces a digital data signal 852, such as an original digital video work. A signature generator 855 is coupled to the source 850 and receives the digital data signal 852. The signature generator 855 generates a signature 857 by applying an algorithm 856 to the digital data signal 852. A storage device 860 is coupled to the signature generator 855 and stores the signature 857 associated with the digital data signal 852.

The process for determining whether a suspected work is a copy of and original work will now be described in more detail with reference to FIG. 5. A source 865 produces a digital data signal 867, such as suspected copy of an original digital video work. A signature generator 855 is coupled to the source 865 and receives the digital data signal 867. The signature generator 855 generates a signature 858 by applying an algorithm 856 to the digital data signal 867. A signature comparator 870 is coupled to the signature generator 855 and a storage device 860. The storage device 860 includes signatures of original digital data works. The signature comparator 870 receives the signature 858, compares the signature 858 to the signatures within the store 860 and, if there is a correlation, issues an alarm signal 873. An alarm 875 is coupled to the signature comparator 870 and issues and alarm should the alarm signal 873 be received.

Two possible algorithms for generating a signature will now be described in more detail for illustrative purposes.

The first algorithm may generate a signature by determining the location of features within a work. A digital data signal may be analysed to determine the location of, for example, the maximum and minimum values of the signal. The generated signature may then comprise the location, either through a spatial co-ordinate system or through bit numbers of the data stream, of the maximum and minimum values of the signal. Preferably, in a digital video signal these maximum and minimum values may correspond to the highest and lowest chrominance values of the pixels of one frame and the generated signature may comprise to co-ordinates of those pixels.

The second algorithm may generate a signature by determining a histogram of the work. A digital data signal may be analysed to determine any measurable components of the signal. The generated signature may then comprise the coefficients of a histogram expressing those measurable components. Preferably, in a digital video signal the measurable components may be the chrominance or luminance values of one frame and the generated signature may comprise the coefficients of a histogram expressing the chrominance or luminance values of the frame.

UMIDs: —FIGS. 6 and 7

A UMID is described in reference [2]. Referring to FIG. 6, an extended UMID is shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 6-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-Byte Universal Label

The first 12 bytes of the UMID provide identification of the UMID by the registered string value defined in table 1.

TABLE 1

Specification of the UMID Universal Label

| Byte No. | Description | Value (hex) |
|---|---|---|
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also the bytes 1-12 may have designations other than those shown by way of example in the table. Referring to the Table 1, in the example shown byte 4 indicates that bytes 5-12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed preassigned values. Byte 11 is variable. Thus referring to FIG. 7, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number. Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17 Nov. 1858 and allows dates to the year 4597.

The Spatial Co-ordinate Format

The spatial co-ordinate value consists of three components defined as follows:

Altitude: 8 decimal numbers specifying up to 99,999,999 meters.
Longitude: 8 decimal numbers specifying East/West 180.00000 degrees (5 decimal places active).
Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Freelance Operators

Freelance operators may use their country of domicile for the country code and use the Organisation and User codes concatenated to e.g. an 8 byte code which can be registered with SMPTE. These freelance codes may start with the '~' symbol (ISO 8859 character number 7Eh) and followed by a registered 7 digit alphanumeric string.

It will be noted from the foregoing discussion that a UMID may be used to identify not only video material, but also audio material, data material, and a group of material.

Figure 8:
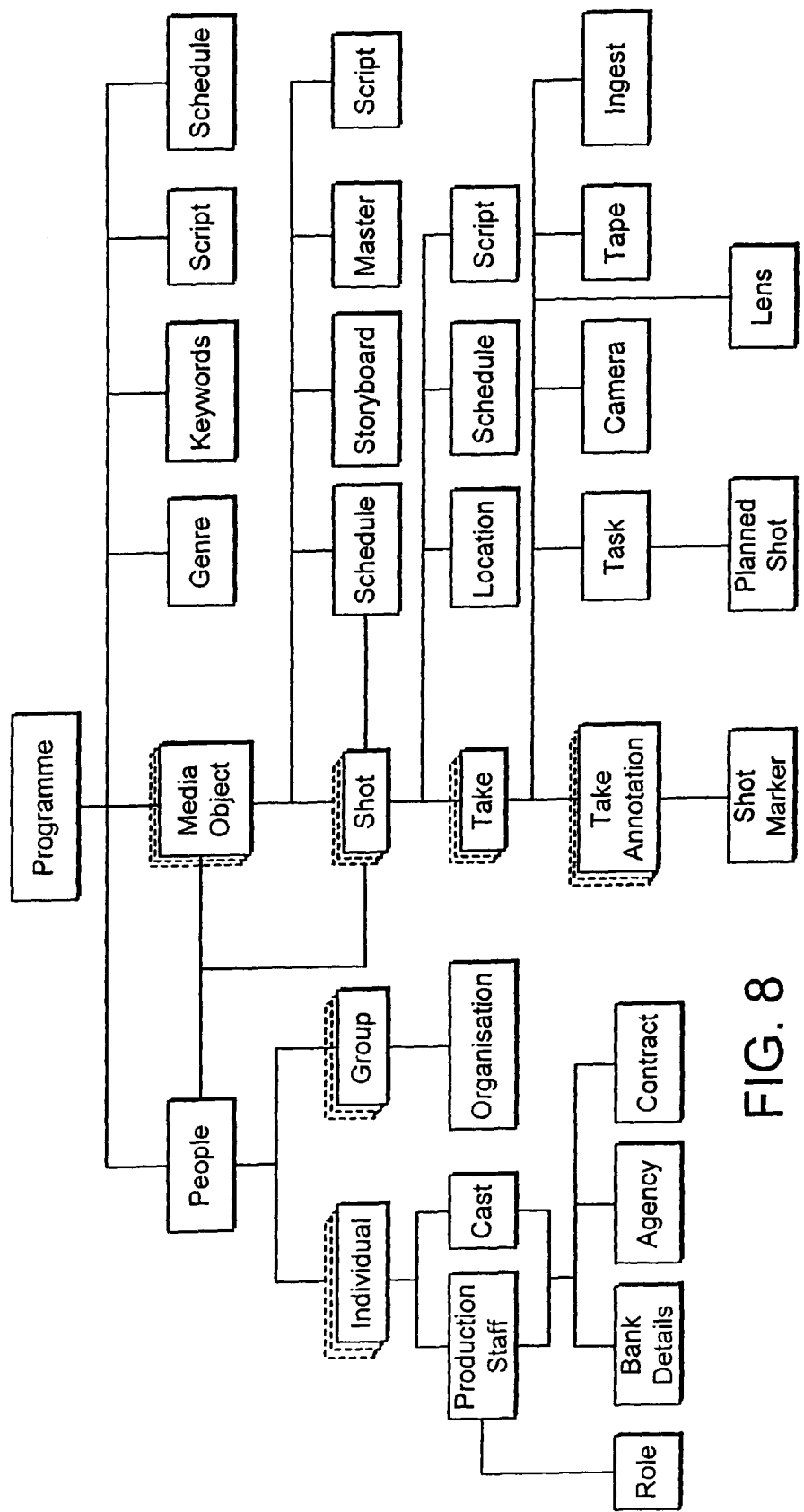
FIG. 8 illustrates an illustrative data structure in a metadata base.

Metadata—FIG. 8

The following is provided, by way of example, to illustrate the possible types of metadata generated during the production of a programme, and one possible organisational approach to structuring that metadata in a database. A UMID embedded in video as a watermark acts as an identifier which links the video to the associated metadata.

FIG. 8 illustrates an example structure for organising metadata. A number of tables each comprising a number of fields containing metadata are provided. The tables may be associated with each other by way of common fields within the respective tables, thereby providing a relational structure. Also, the structure may comprise a number of instances of the same table to represent multiple instances of the object that the table may represent. The fields may be formatted in a predetermined manner. The size of the fields may also be predetermined. Example sizes include "Int" which represents 2 bytes, "Long Int" which represents 4 bytes and "Double" which represents 8 bytes. Alternatively, the size of the fields may be defined with reference to the number of characters to be held within the field such as, for example, 8, 10, 16, 32, 128, and 255 characters.

Turning to the structure in more detail, there is provided a Programme Table. The Programme Table comprises a number of fields including Programme ID (PID), Title, Working Title, Genre ID, Synopsis, Aspect Ratio, Director ID and Picturestamp. Associated with the Programme Table is a Genre Table, a Keywords Table, a Script Table, a People Table, a Schedule Table and a plurality of Media Object Tables.

The Genre Table comprises a number of fields including Genre ID, which is associated with the Genre ID field of the Programme Table, and Genre Description.

The Keywords Table comprises a number of fields including Programme ID, which is associated with the Programme ID field of the Programme Table, Keyword ID and Keyword.

The Script Table comprises a number of fields including Script ID, Script Name, Script Type, Document Format, Path, Creation Date, Original Author, Version, Last Modified, Modified By, PID associated with Programme ID and Notes. The People Table comprises a number of fields including Image.

The People Table is associated with a number of Individual Tables and a number of Group Tables. Each Individual Table comprises a number of fields including Image. Each Group Table comprises a number of fields including Image. Each Individual Table is associated with either a Production Staff Table or a Cast Table.

The Production Staff Table comprises a number of fields including Production Staff ID, Surname, Firstname, Contract ID, Agent, Agency ID, E-mail, Address, Phone Number, Role ID, Notes, Allergies, DOB, National Insurance Number and Bank ID and Picture Stamp.

The Cast Table comprises a number of fields including Cast ID, Surname, Firstname, Character Name, Contract ID, Agent, Agency ID, Equity Number, E-mail, Address, Phone Number, DOB and Bank ID and Picture Stamp. Associated with the Production Staff Table and Cast Table are a Bank Details Table and an Agency Table.

The Bank Details Table comprises a number of fields including Bank ID, which is associated with the Bank ID field of the Production Staff Table and the Bank ID field of the Cast Table, Sort Code, Account Number and Account Name.

The Agency Table comprises a number of fields including Agency ID, which is associated with the Agency ID field of the Production Staff Table and the Agency ID field of the Cast Table, Name, Address, Phone Number, Web Site and E-mail and a Picture Stamp. Also associated with the Production Staff Table is a Role Table.

The Role Table comprises a number of fields including Role ID, which is associated with the Role ID field of the Production Staff Table, Function and Notes and a Picture Stamp. Each Group Table is associated with an Organisation Table.

The Organisation Table comprises a number fields including Organisation ID, Name, Type, Address, Contract ID, Contact Name, Contact Phone Number and Web Site and a Picture Stamp.

Each Media Object Table comprises a number of fields including Media Object ID, Name, Description, Picturestamp, PID, Format, schedule ID, script ID and Master ID. Associated with each Media Object Table is the People Table, a Master Table, a Schedule Table, a Storyboard Table, a script table and a number of Shot Tables.

The Master Table comprises a number of fields including Master ID, which is associated with the Master ID field of the Media Object Table, Title, Basic UMID, EDL ID, Tape ID and Duration and a Picture Stamp.

The Schedule Table comprises a number of fields including Schedule ID, Schedule Name, Document Format, Path, Creation Date, Original Author, Start Date, End Date, Version, Last Modified, Modified By and Notes and PID which is associated with the programme ID.

The contract table contains: a contract ID which is associated with the contract ID of the Production staff, cast, and organisation tables; commencement date, rate, job title, expiry date and details.

The Storyboard Table comprises a number of fields including Storyboard ID, which is associated with the Storyboard ID of the shot Table, Description, Author, Path and Media ID.

Each Shot Table comprises a number of fields including Shot ID, PID, Media ID, Title, Location ID, Notes, Picturestamp, script ID, schedule ID, and description. Associated with each Shot Table is the People Table, the Schedule Table, script table, a Location Table and a number of Take Tables.

The Location Table comprises a number of fields including Location ID, which is associated with the Location ID field of the Shot Table, GPS, Address, Description, Name, Cost Per Hour, Directions, Contact Name, Contact Address and Contact Phone Number and a Picture Stamp.

Each Take Table comprises a number of fields including Basic UMID, Take Number, Shot ID, Media ID, Timecode IN, Timecode OUT, Sign Metadata, Tape ID, Camera ID, Head Hours, Videographer, IN Stamp, OUT Stamp. Lens ID, AUTOID ingest ID and Notes. Associated with each Take Table is a Tape Table, a Task Table, a Camera Table, a lens table, an ingest table and a number of Take Annotation Tables.

The Ingest table contains an Ingest ID which is associated with the Ingest Id in the take table and a description.

The Tape Table comprises a number of fields including Tape ID, which is associated with the Tape ID field of the Take Table, PID, Format, Max Duration, First Usage, Max Erasures, Current Erasure, ETA (estimated time of arrival) and Last Erasure Date and a Picture Stamp.

The Task Table comprises a number of fields including Task ID, PID, Media ID, Shot ID, which are associated with the Media ID and Shot ID fields respectively of the Take Table, Title, Task Notes, Distribution List and CC List. Associated with the Task Table is a Planned Shot Table.

The Planned Shot Table comprises a number of fields including Planned Shot ID, PID, Media ID, Shot ID, which are associated with the PID, Media ID and Shot ID respectively of the Task Table, Director, Shot Title, Location, Notes, Description, Videographer, Due date, Programme title, media title Aspect Ratio and Format.

The Camera Table comprises a number of fields including Camera ID, which is associated with the Camera ID field of the Take Table, Manufacturer, Model, Format, Serial Number, Head Hours, Lens ID, Notes, Contact Name, Contact Address and Contact Phone Number and a Picture Stamp.

The Lens Table comprises a number of fields including Lens ID, which is associated with the Lens ID field of the Take Table, Manufacturer, Model, Serial Number, Contact Name, Contact Address and Contact Phone Number and a Picture Stamp.

Each Take Annotation Table comprises a number of fields including Take Annotation ID, Basic UMID, Timecode, Shutter Speed, Iris, Zoom, Gamma, Shot Marker ID, Filter Wheel, Detail and Gain. Associated with each Take Annotation Table is a Shot Marker Table.

The Shot Marker Table comprises a number of fields including Shot Marker ID, which is associated with the Shot Marker ID of the Take Annotation Table, and Description.

Whilst the foregoing description illustrates the invention by reference to video material, the invention may be applied to any one or more of video material, audio material and data material.

UMIDs are long e.g. 32 or 64 bytes. The watermark may contain another shorter identifier which is related to a UMID stored in the database. Thus the code on which the watermark is based may indirectly identify the material.

It will be appreciated that embodiments of the invention use digital signals and that the invention may be implemented using programmable digital signal processors. Thus the invention includes computer program products which when run on a digital signal processor implement the invention and storage media storing such computer program products.

The invention claimed is:

1. A method of transferring information material via a network, comprising:

at a first device, acquiring a signature for a piece of information material, the signature representing a data characteristic of the piece of information material and being indicative of the information material;

providing, by the first device to a second device, the acquired signature;

at the second device, identifying an identified piece of information material as the piece of information material from a plurality of pieces of information material stored in the second device from the signature by comparing the signature with signatures stored in the second device in association with respective pieces of information material;

transferring, from the second device to the first device, the identified piece of information material, wherein the identified piece of information material is transferred with a watermark embedded therein, the watermark containing an authorization code; and at the first device, performing steps of detecting and extracting from the watermark the authorization code; and in dependence on the authorization code, selectively allowing the first device to duplicate the piece of information material, wherein in the providing step the signature provided by the first device is performed independent of the authorization code, wherein the acquiring step includes acquiring the signature by analyzing at least one location of maximum or minimum values of a signal defining the information material or a histogram of measurable components of the piece of information material.

2. A method according to claim 1, wherein the acquiring step includes acquiring the signature by generating the signature from the piece of information material.

3. A method according to claim 1, wherein the signature at the first device is received from a further device in the network.

4. A method according to claim 1, further comprising, at the first device, transferring the signature to a further device.

5. A method according to claim 1, further comprising, at the first device, transmitting the signature to a further device, said further device being in communication with the network.

6. A non-transitory computer-readable medium encoded with a computer program product containing computer readable instructions stored on the medium that when executed processor performs steps comprising:

at a first device, acquiring a signature for a piece of information material, the signature representing a data characteristic of the piece of information material and being indicative of the information material;

providing, by the first device to a second device, the acquired signature;

at the second device, identifying an identified piece of information material as stored in the second device from the signature by comparing the signature with signatures stored in the second device in association with respective pieces of information material;

transferring, from the second device to the first device, the identified piece of information material, wherein the identified piece of information material is transferred with a watermark embedded therein, the watermark containing an authorization code; and at the first device, performing steps of detecting and extracting from the watermark the authorization code; and in dependence on the authorization code, selectively allowing the first device to duplicate the piece of information material, wherein in the providing step the signature provided by the first device is performed independent of the authorization code, wherein the acquiring step includes acquiring the signature by analyzing at least one location of maximum or minimum values of a signal defining the information material or a histogram of measurable components of the piece of information material.

7. The non-transitory computer-readable medium of claim 6, wherein the acquiring step includes acquiring the signature by generating the signature from the piece of information material.

8. The non-transitory computer-readable medium of claim 6, wherein the signature at the first device is received from a further device in the network.

9. The non-transitory computer-readable medium of claim 6, further comprising, at the first device, transferring the signature to a further device.

10. The non-transitory computer-readable medium of claim 6, further comprising, at the first device, transmitting the signature to a further device, said further device being in communication with the network.

11. A system for transferring information material via a network, comprising:

a first device configured to acquire a signature for a piece of information material, the signature representing a data characteristic of the piece of material and being indicative of the information material;

said first device further including a data interface configured to provide the signature from the first device to a second device;

the second device configured to identify an identified piece of information material as the piece of information material from a plurality of pieces of information stored in the second device from the signature by comparing the signature with signatures stored in a storage mechanism in the second device, said signatures being stored in the storage device in association with a respective pieces of information material; and said second device including another information port configured to transfer the identified piece of information material to the first device, wherein the identified piece of information material is transferred with a watermark embedded therein, the watermark containing an authorization code, wherein said first device containing a watermark processing mechanism configured to detect and extract the watermark from the authorization code, and in dependence on the authorization code, selectively allowing the first device to duplicate the piece of information material, where the signature provided by the first device is independent of the authorization code, and the first device acquires the signature by analyzing at least one location of maximum or minimum values of a signal defining the information material or a histogram of measurable components of the piece of information material.

12. The system of claim 11, wherein the acquiring step includes acquiring the signature by generating the signature from the piece of information material.

13. The system of claim 11, wherein the signature at the first device is received from a further device in the network.

14. The system of claim 11, further comprising, at the first device, transferring the signature to a further device.

15. The system of claim 11, further comprising, at the first device, transmitting the signature to a further device, said further device being in communication with the network.

\* \* \* \* \*